Feb. 2, 1954

S. D. POOL ET AL 2,667,727

ROW DEFINING APPARATUS FOR CANE HARVESTERS

Filed Jan. 22, 1952

Inventors.
Stuart D. Pool
Edward M. Melin
Paul O. Pippel
Atty

Feb. 2, 1954    S. D. POOL ET AL    2,667,727
ROW DEFINING APPARATUS FOR CANE HARVESTERS
Filed Jan. 22, 1952    2 Sheets-Sheet 2

Inventors
Stuart D. Pool
Edward M. Melin
Paul O. Rippel
Atty.

Patented Feb. 2, 1954

2,667,727

UNITED STATES PATENT OFFICE 2,667,727

ROW DEFINING APPARATUS FOR CANE HARVESTERS

Stuart D. Pool, Moline, and Edward M. Melin, Rock Island, Ill., assignors to International Harvester Company, a corporation of New Jersey Application January 22, 1952, Serial No. 267,526

12 Claims. (Cl. 56—95)

1

This invention relates to a new and improved row defining apparatus for cane harvesters.

Cane harvesting machinery and particularly cane harvesters which are employed to pass through a field of standing cane and harvest the cane, require means for defining or separating the cane into rows so that the harvesting machine may effective cut the cane and either deposit it in the field or deliver it to trailing wagons or the like. The inherent nature of cane in certain areas is to become tangled and matted on the ground because of storms and to grow in irregular fashion so that there are no clearly defined rows of cane stools. Although the cane is initially planted in row formation, the cane from the rows becomes intertwined making it impossible to propel a harvesting machine therethrough without preliminarily cutting between the rows of cane to permit treatment thereof by a harvesting machine without pulling cane stalks, the roots of which are in adjacent rows.

The principal object of the present invention is therefore to provide a twofold function of clearly defining rows of cane preliminary to harvesting of the cane and to confine the defined row in a relatively narrow space to insure complete harvesting thereof.

An important object of this invention is the provision of means in a row defining apparatus for picking up down cane and shearing it to permit easy pickup of the cane by a trailing harvesting machine.

Another important object of this invention is to supply means on the forward end of a cane harvesting machine for separating tangled rows of cane.

Still another object of this invention is to provide spaced ground scraping means positioned forwardly of a cane harvester for simultaneously lifting down and matted cane upwardly and inwardly.

Another and still further important object of this invention is to provide leaf spring members arranged and constructed in an overlapped and fan shaped manner and adapted to scrape the ground of a cane field whereby down cane stalks are elevated on the leaf spring members and are positively sheared by a rotating cutter member whereafter they are conveyed transversely inwardly for deposit in a narrow windrow along

2 with the cane standing in that row for convenient pickup and cutting by a harvesting machine.

A still further important object of this invention is the provision of a row defining apparatus for cane fields wherein there are employed oppositely disposed auger conveyor members for transforming a relatively wide row of cane into a relatively narrow row.

Other and further important objects of this invention will become apparent from the disclosures in the following specification and accompanying drawings.

Figure 1:
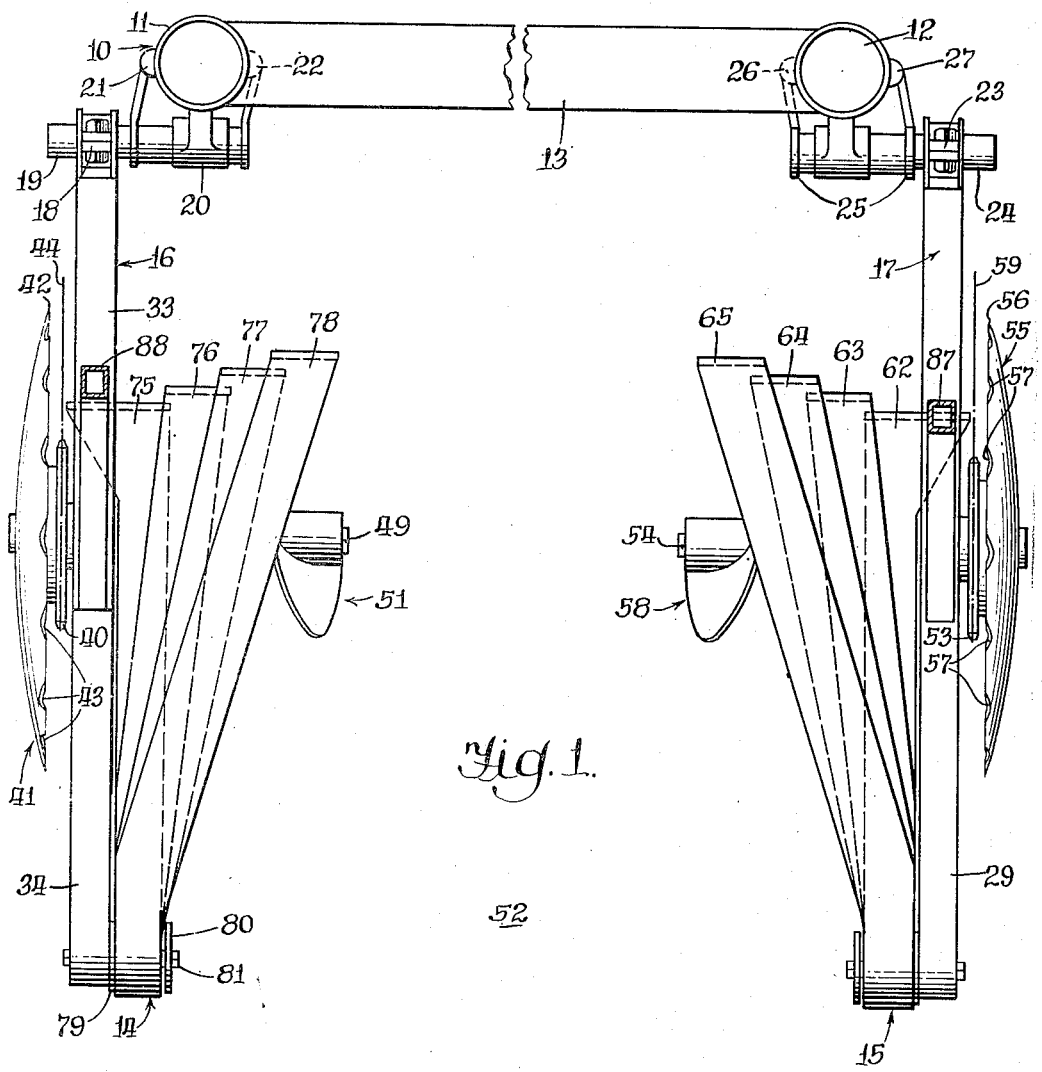
Fig. 1 is a top plan view of the row defining apparatus of this invention.
Figure 4:
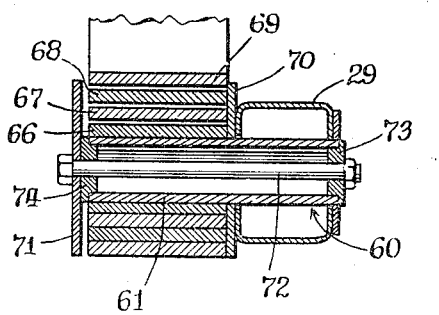
Fig. 4 is a sectional view taken on the line 4—4 of Fig. 2.

The reference numeral 10 indicates generally the frame members of a cane harvesting machine which is not shown in its entirety. The cane harvester includes a pair of vertically disposed transversely spaced pipe members 11 and 12 and a cross beam 13. This structure comprises the forward end of a field traversing cane harvester.

Figure 2:
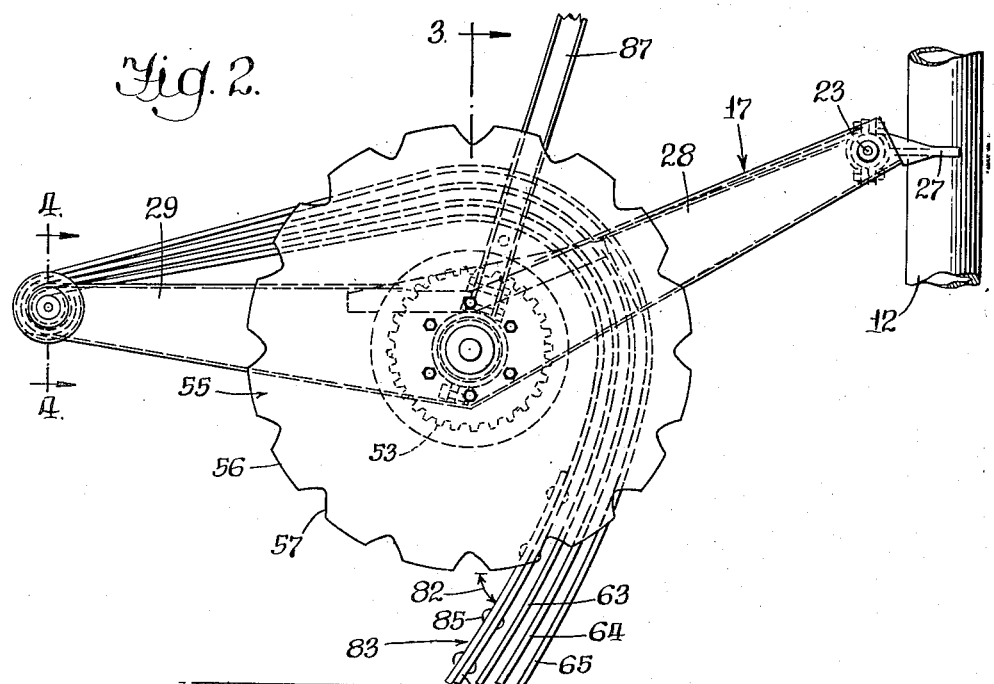
Fig. 2 is a side elevational view of the device as shown in Fig. 1.

As stated in the objects above, it is the function of the row defining apparatus of this invention to be positioned forwardly of a harvesting machine for the purpose of separating the cane, however it might be tangled, into clearly defined narrow rows. The row defining apparatus comprises spaced members 14 and 15. Each of the members 14 and 15 includes a forwardly extending frame arm 16 and 17 respectively. The arm 16, as shown in Figs. 1 and 2, is hingedly mounted at 18 on a transversely disposed stub shaft 19 carried in bracket means 20 which in turn is fastened to the upright pipe member 11 of the cane harvester frame 10 at 21 and 22. Similarly the frame arm 17 of the row defining member 15 is hingedly mounted for vertical swinging movement at 23 on a stub shaft 24 which is carried in a bracket member 25 fastened to the upright pipe member 12 at 26 and 27.

Figure 3:
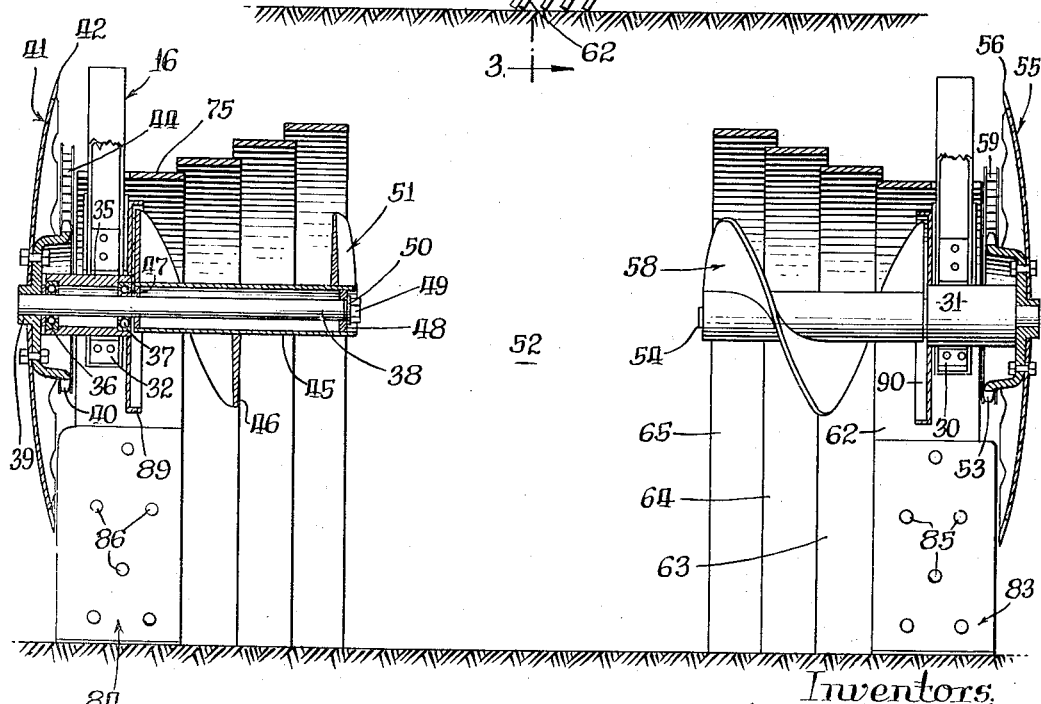
Fig. 3 is a sectional view taken on the line 3—3 of Fig. 2.

The frame member 17 for the row defining member 15 includes a first part 28 inclined forwardly and downwardly from the supporting post or pipe 12 of the cane harvester frame 10. A second part 29 of the hinged frame member 17 thereafter extends forwardly and slightly upwardly. The frame member 17 is thus in the form of a slight bell-crank. The central or intermediate portion of the frame member 17 between the portions 28 and 29 is designated by the numeral 30, and as best shown in Fig. 3 the portion 30 of the frame member 17 fixedly carries a sleeve-like bushing member 31. Similarly the row defining member 14, as shown in Fig. 3, includes the frame member 16 as having a central portion 32 between a forwardly and downwardly extending portion 33 and a forwardly and slightly upwardly extending portion 34. A sleeve 35 is carried in the center or bell-crank portion 32 of the hinged frame arm 16. Spaced ball bearing members 36 and 37 are disposed within the sleeve 35 and journally receive a transversely disposed shaft 38. A hub 39 is fixedly mounted to the journaled shaft 38. A sprocket 40 is formed inwardly of the hub 39 and lies adjacent the hinged frame arm 16. A relatively large dish-shaped disk 41 is provided with a peripheral knife edge 42 which as shown in Fig. 1 is scalloped with a plurality of spaced notches 43. A driven chain 44 is adapted to encircle the sprocket 40 and impart rotational drive thereto. Rotation of the sprocket 40 causes the concurrent rotation of the cutting disk 41 and the shaft 38.

A sleeve 45 is mounted on the shaft 38 spaced inwardly of the sleeve 35. The sleeve 45 constitutes a core about which is carried a spiral flight or screw member 46. The core 45 is disposed concentric to the shaft 38 and is mounted thereover by spaced end ring members 47 and 48. A nut 49 engages the threaded end of the shaft 38 and abuts an enlarged annular washer 50 lying adjacent the ring 48. The auger conveyor, designated as a unit by the numeral 51 and as previously stated, comprises the core 45 and the screw flight 46. The anger 51 thus rotates with the shaft 38, and cane stalks which are cut by the rotating disk 41 are conveyed transversely inwardly to the space 52 between the row defining members 14 and 15.

In the same manner as the row defining member 14 is constructed the member 15 includes a sprocket 53 carried on a shaft 54 which is journaled for rotation within the fixed sleeve 31. The sprocket 53 has attached thereto a large diameter dish-shaped rotating disk 55 having a circumferential knife edge 56 scalloped or notched at 57 in the same manner as the disk 41. A side elevational view of the disk 55 is shown in Fig. 2 clearly indicating the knife edge 56 and the regularly spaced scallops 57 around the circumference thereof. An auger conveyor 58 is fastened to the shaft 54 and upon rotation of the sprocket 53 by reason of the driven chain 59 the cutter disk 55 is adapted to cut through stalks of cane and whereafter the cut stalks are fed laterally inwardly by reason of the conveyor 58. It is apparent that both of the row defining members 14 and 15 deposit the cane centrally thereof in the space 52 for the later treatment by the following harvesting machine.

The forward end of the portion 29 of the hinged arm 17 fixedly carries a sleeve shaft member 60. The sleeve 60 has a laterally extending portion 61 beyond the side of the hinged arm 17. A plurality of ground scraping spring arms or fingers 62, 63, 64, and 65 are supported by the laterally extending sleeve portion 61. Each of the spring arms 62, 63, 64, and 65 is provided with a circular bearing portion at its forward end as shown at 66, 67, 68, and 69 respectively. The circular portion 66 of the arm 62 is slidably mounted over the sleeve portion 61 and similarly the circular portions 67, 68, and 69 are disposed over the sleeve portion 61 and the circular portion 66 of the arm 62 in concentric manner and in the order named. The circular portions 66, 67, 68, and 69 are relatively loosely mounted over one another so that their respective arms 62, 63, 64, and 65 have relatively free and separate hinged movement about the sleeve shaft 60. Spaced side plate members 70 and 71 are carried on the sleeve shaft 60 and the annular walls thereof contain the circular portions 66, 67, 68, and 69 in their aligned concentric relationship. A bolt member 72 passes transversely through the sleeve 60 and with the aid of disk members 73 and 74 maintains the forward unit relatively compact and in fixed relationship permitting only the hinged movement of the arms 62, 63, 64, and 65 vertically about the sleeve portion 61 of the sleeve shaft 60. The row defining unit 14 is similarly constructed with ground scraping leaf spring fingers 75, 76, 77, and 78 which are carried in the same manner as the spring members 62, 63, 64, and 65 of the row defining unit 15. Washer members 79 and 80 are disposed between the forward portion 34 of the hinged arm 16 and the outside of the journalling ends of the spring arms or fingers 75, 76, 77, and 78 and are held in fixed relationship by reason of the bolt member 81 corresponding to the bolt member 72 of the unit 15.

The ground engaging portions of the spring arms 62, 63, 64, and 65 are normally inclined downwardly and forwardly in the manner of shovels to scoop up any cane stalks that are lying on the ground. The stalks climb up the inclined surfaces of these arms and are thus delivered into the path of the rotating cutter disk 55. As the stalks rise on the shovels or ground engaging arms 62, 63, 64, and 65, they enter the angle 82 defined between the circumference of the cutter disk 55 and the downwardly and forwardly inclined arm ends. Further, as shown in Figs. 1 and 3, the arms overlap slightly whereby the stalks picked up and cut will tend to be delivered transversely inwardly by reason of the relationship of the arms and their rearward and upward inclination. In other words, the cut stalks are gradually fed inwardly by the overlapped spring arms as the arms drag the ground and perform the function of clearly defining a row of cane for operation thereon by a cane harvester. The inwardly moving forces of the overlapping spring arms and the auger conveyor 58 are supplemental one to the other so that there is a positive moving force for the cane stalks after they are severed toward the central space 52 between the spaced apart row defining units 14 and 15. The function of the row defining member 14 is identical to that of the row defining member 15 but for the movement of the stalk material opposite thereto so that both units are feeding to the central space 52.

In order that a positive shearing of the stalks be accomplished, shear plates 83 and 84 are attached by means of rivets or the like 85 and 86 to the innermost spring arms 62 and 75 respectively. The shear plates 83 and 84 extend outwardly beyond the outer edges of the arms 62 and 75 into close proximity to the circumferential knife edges 56 and 42 of the rotating cutting disks 55 and 41 respectively. It is therefore evident that when the stalks are delivered upwardly on the shovel arms, they will be definitely sheared by their contact with the rotating cutter disks 41 and 55.

As best shown in Fig. 2, a lifting arm 87 carried by the cane harvester frame 10 at a position, not shown, projects forwardly and downwardly to attachment with the hinged frame arm 17 at the intermediate position thereof where the disk cutter 55 and inwardly conveying auger 58 are mounted. Similarly an arm 88 adjustably carries the intermediate portion of the hinged arm 16, and it should be understood that the arms 87 and 88 may be separately or simultaneously vertically adjusted, as desired, to effect a raising or a lowering of the row defining units 14 and 15. As best shown in Fig. 3, the inwardly projecting and carrying augers 51 and 58 respectively are equipped with stationary cup-like disk members 89 and 90. These cup-like disk members 89 and 90 are fixed to the sleeves 35 and 31 so that they remain stationary when the augers 51 and 58 are rotating. These members 89 and 90 prevent cane or other material from entering the drive mechanism for the cutting discs and the augers.

In the operation of this device the row defining members 14 and 15 are propelled forwardly through a field of cane which includes standing and down cane. The ground scraping and shoveling fingers of the respective row defining members 14 and 15 lift the down cane and deliver the stalks upwardly into the paths of the rotating cutter disks which clearly separate the stalks between the rows and deliver the severed stalk ends inwardly to the space 52 between the row defining units 14 and 15. The inwardly extending augers 51 and 58 add to the positive delivery of the stalks to the central position 52. The row defining members thus act to clearly separate the tangled rows of cane and confine the down and standing stalks in a narrow compact row easily handled by the oncoming cane harvester.

The ground engaging fingers of both of the row defining units are spread in a fan shape and extend from a vertex position at the forward ends of the hinged frame arms 16 and 17 rearwardly and over the inwardly carrying augers 51 and 58 and thence forwardly and downwardly where they yieldably engage and scrape the ground. The fan and the overlap formations of the spring ground scraping fingers cooperate with the transversely disposed auger conveyors in such a manner that the row defining units clearly cause a separation of the cane whether it be standing or down and, as previously stated, supplement each other in the movement of material in a relatively wide to a relatively narrow row. The spring fingers as they curve over and down around the auger conveyors thus hold any stalks in against the auger conveyors so that material is positively fed to the space 52 between the spaced row defining members.

Numerous details of construction may be varied throughout a wide range without departing from the principles disclosed herein and we therefore do not propose limiting the patent granted hereon otherwise than as necessitated by the appended claims.

What is claimed is:

1. A stalk raising, cutting and conveying apparatus comprising a supporting frame, a forwardly projecting frame arm hinged at its rearward end to said supporting frame, a substantially vertically disposed cutter disc journaled on a transverse axis intermediate the ends of said frame arm, the circumference cutting edge of said disc spaced vertically upwardly from the ground, a plurality of ground engaging spring fingers hinged for free swinging movement about the forward end of the frame arm, the outer of said spring fingers lying closely adjacent said cutter disc, said spring fingers extending rearwardly beyond the transverse axis of said cutter disc and thence inclined downwardly and forwardly, whereby stalks raked by the spring fingers are raised up the inclined portions of the spring fingers and into the scope of the cutter disc, said spring fingers spread inwardly in fan formation from the outer of said spring fingers with a slight overlapping to provide for a gradual movement of stalks cut by the disc cutter inwardly thereof as the apparatus moves forwardly through a field of stalk crops.

2. A device as set forth in claim 1 in which an auger conveyor is mounted for rotation with said disc cutter and extends transversely inwardly thereof beneath and forwardly of said spring fingers, and said auger conveyor having a circumference spaced vertically upwardly from the ground.

3. A device as set forth in claim 1 in which the cutter disc has a scalloped circumference.

4. A device as set forth in claim 1 in which means is provided for rotatably driving said cutter disc.

5. A device as set forth in claim 2 in which means is provided for simultaneously rotatably driving said cutter disc and said auger conveyor.

6. A device as set forth in claim 5 in which a shear plate is fastened to the outer of said spring fingers, said shear plate positioned in shearing relationship with said disc cutter, whereby the combined action of the shear plate and disc cutter effectively cuts stalks.

7. A row defining unit for stalk crops comprising a supporting framework, a forwardly disposed arm hinged to said supporting framework at its rearward end, a cutter disc journally mounted to said hinged arm intermediate the ends thereof, an auger conveyor fastened to said cutter disc and rotatable therewith, a journal support located on the forward end of said hinged arm, a plurality of ground scraping spring fingers having forwardly disposed circular ends, means mounting said circular ends on said journal support in concentric relationship, said spring fingers spreading in fan shape rearwardly over the auger conveyor and thence downwardly and forwardly, and said spring fingers slightly overlapped in lateral relationship from a forward position adjacent the cutter disc to a rearward position spaced from the cutter disc.

8. A device as set forth in claim 7 in which drive means is delivered to said cutter disc and said auger conveyor.

9. A device as set forth in claim 8 in which means is provided for vertically adjusting said hinged frame arm.

10. A device as set forth in claim 8 in which a shear plate is fastened to one of said spring arms adjacent said cutter disc.

11. A stalk raising, cutting and conveying apparatus comprising a supporting frame mounted for oscillatory movement, a vertically disposed disc cutting means carried by said supporting frame spaced above the ground, means for driving said vertically disposed disc cutting means, laterally extending ground scraping means carried by the supporting frame and having one end thereof extending into juxtaposition with the vertically disposed disc cutting means, and a transversely disposed auger conveying means attached to the vertically disposed disc cutting means for moving cut material laterally inwardly of said vertically disposed disc cutting means and along the ground scraping means.

12. A device as set forth in claim 11 in which the ground scraping means is yieldably mounted on the supporting frame.

STUART D. POOL.
EDWARD M. MELIN.

References Cited in the file of this patent

UNITED STATES PATENTS

| Number | Name | Date |
|---|---|---|
| 113,223 | Thomas | Mar. 28, 1871 |
| 263,546 | Logan | Aug. 29, 1882 |
| 432,650 | Terman | July 22, 1890 |
| 642,597 | Fosnot | Feb. 6, 1900 |

FOREIGN PATENTS

| Number | Country | Date |
|---|---|---|
| 18,233 | Australia | June 16, 1924 |